United States Patent
Noethe et al.

(10) Patent No.: US 9,981,873 B2
(45) Date of Patent: May 29, 2018

(54) HEAT TREATABLE COATED GLASS PANE

(71) Applicant: PILKINGTON GROUP LIMITED, Lathom (GB)

(72) Inventors: Axel Noethe, Castrop-Rauxel (DE); Thomas Paul, Herne (DE)

(73) Assignee: Pilkington Group Limited, Lathom (GB)

( * ) Notice: Subject to any disclaimer, the term of this patent is extended or adjusted under 35 U.S.C. 154(b) by 0 days. days.

(21) Appl. No.: 14/392,388

(22) PCT Filed: Oct. 6, 2014

(86) PCT No.: PCT/GB2014/053005
§ 371 (c)(1),
(2) Date: Mar. 28, 2016

(87) PCT Pub. No.: WO2015/052494
PCT Pub. Date: Apr. 16, 2015

(65) Prior Publication Data
US 2016/0257611 A1    Sep. 8, 2016

(30) Foreign Application Priority Data
Oct. 7, 2013 (GB) .................................. 1317687.0

(51) Int. Cl.
| B32B 15/04 | (2006.01) |
| B32B 17/06 | (2006.01) |
| C03C 17/36 | (2006.01) |
| C03C 17/34 | (2006.01) |
| E06B 9/24 | (2006.01) |

(52) U.S. Cl.
CPC ........ *C03C 17/366* (2013.01); *C03C 17/3435* (2013.01); *C03C 17/36* (2013.01); *C03C 17/3639* (2013.01); *C03C 17/3644* (2013.01); *C03C 17/3681* (2013.01); *C03C 2217/23* (2013.01); *C03C 2217/281* (2013.01); *C03C 2217/74* (2013.01); *E06B 2009/2417* (2013.01)

(58) Field of Classification Search
USPC ....... 428/426, 428, 432, 434, 688, 689, 697, 428/699, 701, 702
See application file for complete search history.

(56) References Cited

U.S. PATENT DOCUMENTS

| 5,935,702 | A | 8/1999 | Macquart et al. |
| 6,602,587 | B2 | 8/2003 | Macquart et al. |
| 6,804,048 | B2 | 10/2004 | Macquart et al. |
| 7,037,577 | B2 | 5/2006 | Macquart et al. |
| 7,659,002 | B2 | 2/2010 | Coster et al. |
| 7,901,781 | B2 | 3/2011 | Maschwitz et al. |
| 8,497,014 | B2 | 7/2013 | Unquera et al. |
| 9,067,822 | B2 | 6/2015 | Maschwitz et al. |
| 2007/0281171 | A1* | 12/2007 | Coster ............... B32B 17/10036 428/432 |
| 2009/0136765 | A1* | 5/2009 | Maschwitz ....... B32B 17/10036 428/432 |
| 2009/0169846 | A1 | 7/2009 | Siddle et al. |
| 2010/0136365 | A1* | 6/2010 | Unquera ................. C03C 17/36 428/623 |

FOREIGN PATENT DOCUMENTS

| EP | 0718250 A2 | 6/1996 |
| WO | 2006124503 A2 | 11/2006 |
| WO | 2007080428 A1 | 7/2007 |
| WO | 2008075107 A1 | 6/2008 |
| WO | 2009001143 A1 | 12/2008 |
| WO | 2009067263 A1 | 5/2009 |
| WO | 2010073042 A1 | 7/2010 |

OTHER PUBLICATIONS

U.K. Intellectual Property Office, GB Search Report, dated Apr. 2, 2014, 1 page, U.K. Intellectual Property Office, Newport, South Wales.
European Patent Office, International Search Report with Written Opinion, dated Mar. 2, 2015, 9 pages, European Patent Office, Rijswijk, Netherlands.

* cited by examiner

*Primary Examiner* — Lauren R Colgan
(74) *Attorney, Agent, or Firm* — Marshall & Melhorn, LLC

(57) ABSTRACT

A coated glass pane comprising at least the following layers in sequence: a glass substrate; a lower anti-reflection layer; a silver-based functional layer; and at least one further anti-reflection layer; wherein the further anti-reflection layer comprises at least the following layers in sequence: at least one barrier layer; at least one absorbing layer based on tungsten nitride; and at least one dielectric layer.

18 Claims, No Drawings

HEAT TREATABLE COATED GLASS PANE

BACKGROUND OF THE INVENTION

The invention relates to heat treatable coated glass panes with a solar control coating. The invention also relates to multiple glazings incorporating said panes.

Heat treated glass panes which are toughened to impart safety properties and/or are bent are required for a large number of areas of application, for example for architectural or motor vehicle glazings. It is known that for thermally toughening and/or bending glass panes it is necessary to process the glass panes by a heat treatment at temperatures near or above the softening point of the glass used and then either to toughen them by rapid cooling or to bend them with the aid of bending means. The relevant temperature range for standard float glass of the soda lime silica type is typically about 580-690° C., the glass panes being kept in this temperature range for several minutes before initiating the actual toughening and/or bending process.

"Heat treatment", "heat treated" and "heat treatable" in the following description and in the claims refer to thermal bending and/or toughening processes such as mentioned before and to other thermal processes during which a coated glass pane reaches temperatures in the range of about 580-690° C. for a period of several minutes, e.g., for up to about 10 minutes. A coated glass pane is deemed to be heat treatable if it survives a heat treatment without significant damage, typical damages caused by heat treatments being high haze values, pinholes or spots.

It is desirable to be able to manufacture a range of coated glass panes with a variety of light and/or heat transmission values in order to meet particular needs. One approach to address this objective is to use a common multilayer stack or platform for each of the different product types (e.g. low-e and solar control, and both heat treatable and non-heat treatable products) and then tune the optical properties of the stack by adding different thicknesses of at least one absorbing layer into each of the stacks.

In the context of the present invention, where a layer is said to be an "absorbing layer" this means that the layer has measurable absorption within the solar energy spectrum, including but not limited to the visible part of the spectrum. Such an absorbing layer may therefore serve the general purpose of controlling (reducing) the solar energy transmission through coated glass panes.

Certain absorbing layers are known in the prior art. For instance, EP 0718250 A2 describes a coating stack with a protective metallic layer (e.g. Nb, Ta, Ti, Cr, Ni, NbTa, TaCr, or NiCr) located directly above a functional metallic layer such as silver. The thickness of the protective metallic layer may be modified to adjust the light transmission.

WO 2008/075107 A1 describes the use of tungsten nitride barrier layers as absorbing layers, preferably both directly above and below a silver-based functional layer. To achieve a sufficient barrier and solar control function the barrier layers comprising tungsten nitride $WN_x$ (x<1) should have a thickness of at least about 2 nm. The fact that the barrier layer must have a minimum thickness (in order that the barrier layer adequately protects the silver-based layer against the reactive plasma during reactive coating of the subsequent dielectric layers) means that the thickness of the tungsten nitride layer is restricted, such that there is not complete freedom with regard to the optical properties that can be attained. Furthermore, the adhesion of barrier layers based on tungsten nitride to a silver-based layer was found to be lower than the adhesion of other barrier layers. Low adhesion between individual layers of a coating stack may lead to delamination of the coating stack, e.g., during heat treatments.

WO 2009/067263 A1 describes coatings with at least two silver layers which may be protected with absorbing barrier layers. The absorbing barrier layers may be selected from a wide range of materials, although NiCr is preferred. NiCr-based absorbing layers tend to oxidise during heat treatments and thereby change their optical properties significantly.

WO 2009/001143 A1 discloses coated glass panes wherein an absorbing layer is embedded in an Al (oxi)nitride layer being part of an anti-reflection layer of a low-e and/or solar control coating stack. The absorbing layer may comprise a metal or a metal nitride, preferably NiCr, tungsten or their nitrides. Such arrangement increases the complexity of the stack.

DETAILED DESCRIPTION OF THE INVENTION

It would be desirable to provide a solar control coating incorporating at least one absorbing layer based on tungsten nitride that is thermally stable upon heat treatment such that the optical properties do not change, that enables greater flexibility with regard to the optical properties that can be achieved, and that allows for barrier layers with better adhesion to silver-based layers, without the need to embed the absorbing layer based on tungsten nitride in a protecting layer of, e.g., an (oxi)nitride of Al and/or Si.

According to a first aspect of the present invention there is provided a coated glass pane comprising at least the following layers in sequence:
a glass substrate;
a lower anti-reflection layer;
a silver-based functional layer; and
at least one further anti-reflection layer; wherein the further anti-reflection layer comprises at least the following layers in sequence:
at least one barrier layer;
at least one absorbing layer based on tungsten nitride; and
at least one dielectric layer.

The present invention provides multilayer coated glass panes that include an absorbing layer based on tungsten nitride which enables the optical properties, such as solar energy and/or light transmittance, of the panes to be fine tuned according to the thickness of the absorbing layer. The arrangement of the present invention enables high solar energy and/or light absorption even when relatively thin absorbing layers are used.

The panes of the present invention may exhibit low haze and stable, in particular relatively neutral, transmitted or reflected colours before and after heat treatment (the test was to heat a 6 mm thick sample at 610° C. for 5 minutes). Indeed, the optical properties overall may undergo minimal changes during heat treatment which is advantageous from a manufacturing perspective. These coated glass panes may in particular exhibit reflection colour modifications caused by a heat treatment that are so small that heat treated and non-heat treated coated glass panes may be glazed adjacent to each other without a reflection colour difference that is significantly larger than unavoidable production tolerances for coated glass panes. It was surprisingly found that these benefits can be achieved without having to embed the absorbing layer in a protective Al and/or Si (oxi)nitride layer, i.e. the tungsten nitride layer can be in contact with an oxidised layer such as NiCrOx and still have stable optical properties during a heat treatment. Furthermore the particular arrangement of the present invention enables greater flexibility with regard to the optical properties (e.g. the colour characteristics) that can be achieved, and allows for the use of barrier layers with better adhesion to silver-based layers than tungsten nitride by providing a tungsten nitride-based absorbing layer in addition to at least one barrier layer such that it is spaced from an underlying silver-based functional layer by such barrier layer(s).

At least one barrier layer may be based on NiCr, Nb, Ti, Zr, Zn, Sn, In, and/or Cr and/or their oxides and/or nitrides.

The at least one barrier layer located in a given anti-reflection layer may preferably have a total thickness of at least 0.5 nm, more preferably at least 1 nm, even more preferably at least 3 nm, most preferably at least 5 nm; but preferably at most 12 nm, more preferably at most 10 nm, even more preferably at most 8 nm, most preferably at most 7 nm. These preferred thicknesses enable further ease of deposition and improvement in optical characteristics such as haze whilst retaining mechanical durability. Whilst the at least one barrier layer is located in an anti-reflection layer it is preferred that said barrier layer has a total thickness that is sufficiently thin such that said barrier layer does not significantly contribute to the anti-reflective properties of said anti-reflection layer.

At least one dielectric layer may comprise a dielectric layer based on an (oxi)nitride of Si and/or an (oxi)nitride of Al and/or alloys thereof; and/or a dielectric layer based on a metal oxide such as an oxide of one or more of Ti, Zr, Zn, Sn, In, and/or Nb, such as an oxide of Zn and Sn.

Preferably at least one absorbing layer based on tungsten nitride is located in direct contact with an underlying barrier layer (i.e. the underlying barrier layer is located nearer to the glass substrate than the at least one absorbing layer). Preferably said underlying barrier layer is an underlying uppermost barrier layer. In the context of the present invention the use of the term "uppermost" in relation to barrier layers indicates the particular barrier layer of a given anti-reflection layer that is located furthest from the glass substrate.

Preferably the at least one absorbing layer based on tungsten nitride is located in direct contact with an overlying dielectric layer (i.e. the at least one absorbing layer is located nearer to the glass substrate than the overlying dielectric layer).

In preferred embodiments the overlying dielectric layer is based on an (oxi)nitride of Si and/or an (oxi)nitride of Al and/or alloys thereof. When said overlying dielectric layer is based on an (oxi)nitride of Si and/or an (oxi)nitride of Al and/or alloys thereof, preferably an underlying layer that is in direct contact with the at least one absorbing layer is not based on an (oxi)nitride of Si and/or an (oxi)nitride of Al and/or alloys thereof.

Preferably at least one absorbing layer based on tungsten nitride is located in direct contact with both an underlying uppermost barrier layer and an overlying dielectric layer. This arrangement is beneficial in terms of exhibiting the lowest haze and having the potential to achieve the most neutral transmitted or reflected colours before and after heat treatment.

A further anti-reflection layer that is located furthest from the glass substrate may be called "upper anti-reflection layer". Preferably at least one absorbing layer based on tungsten nitride is located in the upper anti-reflection layer. This location is advantageous because it minimises the influence of the absorbing layer on the glass side reflection colour perceived by an observer, such that even if the light and/or energy transmission characteristics of a given coating stack are varied by modifying the thickness of the absorbing layer, the pane can exhibit almost the same appearance. Furthermore this location provides greater flexibility with regard to the optical properties that can be achieved in comparison with locating an absorbing layer in other anti-reflection layers.

In some embodiments the pane comprises only one silver-based functional layer. In these embodiments the only further anti-reflection layer is the upper anti-reflection layer.

In other embodiments the pane comprises more than one silver-based functional layer. For example, the pane may comprise two, three or more silver-based functional layers. When the pane comprises more than one silver-based functional layer, each silver-based functional layer is spaced apart from an adjacent silver-based functional layer by a central anti-reflection layer to form a Fabry-Perot interference filter, whereby the optical properties of the solar control coating may be further optimized for the respective application, as is well known in the art.

In embodiments where the pane comprises more than one silver-based functional layer, the at least one further anti-reflection layer may functionally be a central anti-reflection layer and/or an upper anti-reflection layer as defined hereinbefore. Thus, the at least one absorbing layer based on tungsten nitride may be located in the upper anti-reflection layer and/or in at least one central anti-reflection layer of a coating comprising more than one silver-based functional layer.

Each absorbing layer may preferably have a thickness of at least 0.5 nm, more preferably at least 1 nm, even more preferably at least 2 nm, most preferably at least 3 nm; but preferably at most 25 nm, more preferably at most 15 nm, even more preferably at most 8 nm, most preferably at most 5 nm.

Each absorbing layer based on tungsten nitride is preferably deposited as an essentially stoichiometric nitride, e.g., by supplying sufficient nitrogen when sputtering tungsten nitride absorbing layers from tungsten targets. The invention is however not restricted to such essentially stoichiometric tungsten nitride layers.

The lower anti-reflection layer may comprise one or more of the following layers:
a dielectric layer based on an (oxi)nitride of Si and/or an (oxi)nitride of Al and/or alloys thereof;
a dielectric layer based on an oxide of Ti and/or of an oxide of Zr;
a dielectric layer based on a metal oxide, such as an oxide of Zn and Sn, an oxide of Sn, and/or an oxide of Nb;
a dielectric top layer based on an oxide of Zn.

Preferably the lower anti-reflection layer comprises at least, in sequence from the glass substrate,
a dielectric base layer based on an (oxi)nitride of Si and/or an (oxi)nitride of Al and/or alloys thereof; and/or an oxide of Ti; and/or an oxide of Zr;
a dielectric layer based on a metal oxide, such as an oxide of Zn and Sn, an oxide of Sn, and/or an oxide of Nb; and
a dielectric top layer based on an oxide of Zn.

The lower anti-reflection layer may consist of the three layers in sequence as set out above.

In some embodiments the lower anti-reflection layer comprises at least, in sequence from the glass substrate,
a dielectric base layer based on an (oxi)nitride of Si and/or an (oxi)nitride of Al and/or alloys thereof; and/or an oxide of Ti; and/or an oxide of Zr;

a dielectric layer based on a metal oxide, such as an oxide of Zn and Sn, an oxide of Sn, and/or an oxide of Nb; and a dielectric top layer based on an oxide of Zn.

The dielectric base layer is the lowermost part of the lower anti-reflection layer adjacent to the glass substrate. It may have a thickness of at least 5 nm, preferably from 5 to 60 nm, more preferably from 10 to 50 nm, even more preferably from 20 to 45 nm, most preferably from 20 to 35 nm. The dielectric base layer may comprise more than one layer. The dielectric base layer may serve as a glass side diffusion barrier amongst other uses.

The term "(oxi)nitride of Si" encompasses both Si nitride ($SiN_x$) and Si oxinitride ($SiO_xN_y$) whilst the term "(oxi)nitride of Al" encompasses both Al nitride ($AlN_x$) and Al oxinitride ($AlO_xN_y$). Si nitride, Si oxinitride, Al nitride and Al oxinitride layers are preferably essentially stoichiometric (e.g. Si nitride=$Si_3N_4$, x=1.33; Al nitride=AlN, x=1) but may also be substoichiometric or even super-stoichiometric, as long as the heat treatability of the coating is not negatively affected thereby. In a preferred embodiment the base layer of the lower anti-reflection layer comprises or consists of a layer of an essentially stoichiometric mixed nitride $Si_{90}Al_{10}N_x$.

Layers of an (oxi)nitride of Si and/or an (oxi)nitride of Al and/or alloys thereof may be reactively sputtered from Si- and/or Al-based targets respectively in a sputtering atmosphere containing nitrogen and argon. An oxygen content of the base layer based on an (oxi)nitride of Si and/or an (oxi)nitride of Al and/or alloys thereof may result from residual oxygen in the sputtering atmosphere or from a controlled content of added oxygen in said atmosphere. It is generally preferred if the oxygen content of the Si (oxi)nitride and/or Al (oxi)nitride is significantly lower than its nitrogen content, i.e. if the atomic ratio O/N in the layer is kept significantly below 1. It is most preferred to use Si nitride and/or Al nitride with negligible oxygen content for the base layer of the lower anti-reflection layer. This feature may be controlled by making sure that the refractive index of the layer does not differ significantly from the refractive index of an oxygen-free Si nitride and/or Al nitride layer.

It is within the scope of the invention to use mixed Si and/or Al targets or to otherwise add metals or semiconductors to the Si and/or Al component of this layer as long as the essential barrier and protection property of the base layer of the lower anti-reflection layer is not lost. It is well known and established to mix Al with Si targets, other mixed targets not being excluded. Additional components may be typically present in amounts of up to about 10-15 wt. %. Al is usually present in mixed Si targets in an amount of about 10 wt. %.

The dielectric base layer of the lower anti-reflection layer may alternatively or additionally comprise at least one layer based on $TiO_x$ and/or $ZrO_x$ where x is from 1.5 to 2.0.

The dielectric layer based on a metal oxide, such as an oxide of Zn and Sn, an oxide of Sn, and/or an oxide of Nb, of the lower anti-reflection layer is located over the base layer. It serves to improve stability during a heat treatment by providing a dense and thermally stable layer and contributing to reduce the haze after a heat treatment. The dielectric layer based on a metal oxide may have a thickness of at least 0.5 nm, preferably from 0.5 to 10 nm, more preferably from 0.5 to 9 nm, even more preferably from 1 to 8 nm, even more preferably from 1 to 7 nm, even more preferably from 2 to 6 nm, even more preferably from 3 to 6 nm, most preferably from 3 to 5 nm. An upper thickness limit of about 8 nm is preferred due to optical interference conditions and by a reduction of heat treatability due to the resulting reduction in the thickness of the dielectric base layer that would be needed to maintain the optical interference boundary conditions for anti-reflecting the functional layer.

The dielectric layer based on a metal oxide is preferably located directly on a dielectric base layer based on an (oxi)nitride of Si and/or an (oxi)nitride of Al and/or alloys thereof.

If the dielectric layer based on a metal oxide is based on an oxide of Zn and Sn (abbreviation: $ZnSnO_x$), it preferably comprises about 10-90 wt. % Zn and 90-10 wt. % Sn, more preferably about 40-60 wt. % Zn and about 40-60 wt. % Sn, preferably about 50 wt. % each of Zn and Sn, in wt. % of its total metal content. A layer based on an oxide of Zn and Sn may be deposited by reactive sputtering of a mixed ZnSn target in the presence of $O_2$.

The dielectric top layer based on an oxide of Zn of the lower anti-reflection layer primarily functions as a growth promoting layer for a subsequently deposited silver-based functional layer. The dielectric top layer based on an oxide of Zn is optionally mixed with metals such as Al, Sn, or Ga in an amount of up to about 10 wt. % (wt. % referring to the target metal content). A typical content of said metals such as Al, Sn or Ga is about 2 wt. %, Al being actually preferred. In other preferred embodiments the top layer based on an oxide of Zn may comprise at most 18 wt. % Sn, more preferably at most 15 wt. % Sn, even more preferably at most 10 wt. % Sn. ZnO and mixed Zn oxides have proven very effective as a growth promoting layer that assists in achieving a low sheet resistance at a given thickness of the subsequently deposited silver-based functional layer. It is preferred if the dielectric top layer of the lower anti-reflection layer is reactively sputtered from a Zn target in the presence of $O_2$ or if it is deposited by sputtering a ceramic target, e.g. based on ZnO:Al, in an atmosphere containing no or only a low amount, generally no more than about 5 vol. %, of oxygen. The dielectric top layer based on an oxide of Zn may have a thickness of at least 2 nm, preferably from 2 to 20 nm, more preferably from 4 to 15 nm, even more preferably from 5 to 13 nm, even more preferably from 5 to 11 nm.

The silver-based functional layer(s) may consist essentially of silver without any additive, as is normally the case in the area of low-e and/or solar control coatings. It is, however, within the scope of the invention to modify the properties of the silver-based functional layer(s) by adding doping agents, alloy additives or the like or even adding very thin metal or metal compound layers, as long as the properties of the silver-based functional layer(s) necessary for its (their) function as highly light-transmitting and low light-absorbent IR-reflective layer(s) are not substantially impaired thereby.

The thickness of a silver-based functional layer is dominated by its technical purpose. For typical solar control purposes the preferred layer thickness for a single silver-based layer is from 5 to 20 nm, more preferably from 5 to 15 nm, even more preferably from 5 to 12 nm, even more preferably from 7 to 11 nm, most preferably from 8 to 10 nm. With such a layer thickness light transmittance values of above 86% and a normal emissivity below 0.05 after a heat treatment can be easily achieved for coatings comprising a single functional silver-based layer. If better solar control properties are aimed at the thickness of the silver-based functional layer may be adequately increased or several spaced silver-based functional layers may be provided.

When the pane comprises two silver-based functional layers, the silver-based functional layer located furthest from the glass substrate may preferably have a thickness of from 5 to 25 nm, more preferably from 10 to 21 nm, even more preferably from 13 to 19 nm, even more preferably from 14 to 18 nm, most preferably from 15 to 18 nm.

When the pane comprises three silver-based functional layers, the two silver-based functional layers located furthest from the glass substrate may each independently preferably have a thickness of from 5 to 25 nm, more preferably from 10 to 21 nm, even more preferably from 13 to 19 nm, even more preferably from 14 to 18 nm, most preferably from 15 to 18 nm.

Preferably the dielectric top layer based on an oxide of Zn in the lower anti-reflection layer is in direct contact with the subsequently deposited silver-based functional layer.

A central anti-reflection layer may comprise at least a combination of one or more of the following layers:
at least one barrier layer based on an oxide of NiCr;
at least one barrier layer based on an oxide of Zn, an oxide of Ti and/or Ti;
a dielectric layer based on a metal oxide, such as an oxide of Zn and Sn, an oxide of Sn, and/or an oxide of Nb; and
a dielectric layer based on an (oxi)nitride of Si, and/or an (oxi)nitride of Al, and/or alloys thereof, and/or an oxide of Al, Si, Ti, and/or Zr.

In some preferred embodiments each silver-based functional layer is spaced apart from an adjacent silver-based functional layer by a central anti-reflection layer, wherein each central anti-reflection layer comprises at least, in sequence from the silver-based functional layer that is located nearest to the glass substrate out of the silver-based functional layers that the central anti-reflection layer is located between,
at least one barrier layer based on an oxide of Zn, an oxide of Ti and/or Ti;
a dielectric layer based on an (oxi)nitride of Si, and/or an (oxi)nitride of Al, and/or alloys thereof, and/or an oxide of Al, Si, Ti, and/or Zr,
a dielectric layer based on a metal oxide, such as an oxide of Zn and Sn and/or an oxide of Sn; and
a dielectric top layer based on an oxide of Zn.

An absorbing layer based on tungsten nitride may be located in said central anti-reflection layer according to the preceding paragraph, for example it may be located between the at least one barrier layer based on an oxide of Zn, an oxide of Ti and/or Ti and the dielectric layer based on an (oxi)nitride of Si, and/or an (oxi)nitride of Al, and/or alloys thereof, and/or an oxide of Al, Si, Ti, and/or Zr. When an absorbing layer based on tungsten nitride is located in said central anti-reflection layer, preferably said absorbing layer is located between and in direct contact with the uppermost barrier layer based on an oxide of Zn, an oxide of Ti and/or Ti and the dielectric layer based on an (oxi)nitride of Si, and/or an (oxi)nitride of Al, and/or alloys thereof, and/or an oxide of Al, Si, Ti, and/or Zr.

In some other preferred embodiments each silver-based functional layer is spaced apart from an adjacent silver-based functional layer by a central anti-reflection layer, wherein each central anti-reflection layer comprises at least, in sequence from the silver-based functional layer that is located nearest to the glass substrate out of the silver-based functional layers that the central anti-reflection layer is located between,
at least one barrier layer based on an oxide of NiCr;
optionally, at least one barrier layer based on an oxide of Zn, an oxide of Ti and/or Ti;
a dielectric layer based on an (oxi)nitride of Si, and/or an (oxi)nitride of Al, and/or alloys thereof, and/or an oxide of Al, Si, Ti, and/or Zr,
a dielectric layer based on a metal oxide, such as an oxide of Zn and Sn and/or an oxide of Sn; and
a dielectric top layer based on an oxide of Zn.

An absorbing layer based on tungsten nitride may be located in said central anti-reflection layer according to the preceding paragraph, for example, it may be located between the at least one barrier layer based on an oxide of NiCr and the dielectric layer based on an (oxi)nitride of Si, and/or an (oxi)nitride of Al, and/or alloys thereof, and/or an oxide of Al, Si, Ti, and/or Zr. When an absorbing layer based on tungsten nitride is located in said central anti-reflection layer according to the preceding paragraph, preferably the optional at least one barrier layer based on an oxide of Zn, an oxide of Ti and/or Ti is not present. Preferably said absorbing layer is located between and in direct contact with the uppermost barrier layer based on an oxide of NiCr and the dielectric layer based on an (oxi)nitride of Si, and/or an (oxi)nitride of Al, and/or alloys thereof, and/or an oxide of Al, Si, Ti, and/or Zr. It has been established that surprisingly the barrier layer based on an oxide of Zn, an oxide of Ti and/or Ti is not necessary when an absorbing layer is present. When the optional at least one barrier layer based on an oxide of Zn, an oxide of Ti and/or Ti and an absorbing layer based on tungsten nitride are both present in said central anti-reflection layer according to the preceding paragraph, preferably the absorbing layer is located between and in direct contact with the uppermost barrier layer based on an oxide of Zn, an oxide of Ti and/or Ti and the dielectric layer based on an (oxi)nitride of Si, and/or an (oxi)nitride of Al, and/or alloys thereof, and/or an oxide of Al, Si, Ti, and/or Zr.

The at least one barrier layer based on an oxide of NiCr may preferably have a thickness of at least 0.3 nm, more preferably at least 0.4 nm, even more preferably at least 0.5 nm, most preferably at least 0.6 nm; but preferably at most 10 nm, more preferably at most 5 nm, even more preferably at most 2 nm, most preferably at most 1 nm. These preferred thicknesses enable further ease of deposition and improvement in optical characteristics such as haze whilst retaining mechanical durability.

The optional at least one barrier layer based on an oxide of Zn, an oxide of Ti and/or Ti of a central anti-reflection layer may independently preferably have a thickness of at least 1 nm, more preferably at least 2 nm, even more preferably at least 3 nm, most preferably at least 4 nm; but preferably at most 10 nm, more preferably at most 7 nm, even more preferably at most 6 nm, most preferably at most 5 nm. These preferred thicknesses enable further ease of deposition and improvement in optical characteristics such as haze whilst retaining mechanical durability.

In the context of the present invention barrier layers are primarily intended to protect an underlying silver-based functional layer against damage during the deposition process of subsequent layers and during heat treatments. They further serve to provide adhesion between the silver-based functional layers and subsequent layers such as dielectric layers or absorbing layers. By making them as thin as feasible, depending on the materials chosen, they are designed to not significantly contribute to the anti-reflection function of the anti-refection layers. To the opposite, the dielectric layers according to the invention have as their primary function to anti-reflect the silver-based functional layer(s) based on optical interference; therefore they need to be attributed a significantly larger thickness than the barrier layers.

It has been generally found that a superior protection of the silver-based functional layer(s) during the deposition process and a high optical stability during a heat treatment can be achieved if a barrier layer comprises a layer of a mixed metal oxide sputtered from a mixed metal oxide target. When a barrier layer is based on an oxide of Zn, said oxide may be a mixed metal oxide such as ZnO:Al. Good results are particularly achieved if a barrier layer based on ZnO:Al is sputtered from a conductive ZnO:Al target. ZnO:Al may be deposited fully oxidized or such that it is slightly suboxidic. Preferably the ZnO:Al barrier layer is essentially stoichiometric. The use of essentially stoichiometric ZnO:Al barrier layers rather than metallic or less than 95% stoichiometric ZnO:Al barrier layers leads to an extremely high optical stability of the coating during a heat treatment and effectively assists in keeping optical modifications during a heat treatment small. Additionally the use of barrier layers based on essentially stoichiometric metal oxides provides benefits in terms of mechanical robustness.

When a barrier layer is based on an oxide of NiCr it is preferably deposited as a substoichiometric oxide. This enables the layer to act as an oxygen scavenger/absorber during a heat treatment.

At least a portion of a barrier layer that is in direct contact with a silver-based functional layer is preferably deposited using non-reactive sputtering of an oxidic target to avoid silver damage.

Preferably barrier layers based on an oxide of Zn, an oxide of Ti and/or Ti are deposited by non-reactive sputtering. In the case of oxidic barrier layers they are preferably sputtered from ceramic targets. In the context of the present invention the term "non-reactive sputtering" includes sputtering an oxidic target in a low oxygen atmosphere (no or up to 5 vol. % oxygen) to provide an essentially stoichiometric oxide.

Where a barrier layer is based on TiOx, x may be from 1.5 to 2.0.

The preceding general disclosure concerning barrier layers applies also to barrier layers of upper anti-reflection layers as discussed further below.

The dielectric layer based on a metal oxide, such as an oxide of Zn and Sn and/or an oxide of Sn of a central anti-reflection layer may preferably have a thickness of at least 2 nm, more preferably at least 5 nm, even more preferably at least 8 nm, most preferably at least 10 nm; but preferably at most 40 nm, more preferably at most 30 nm, even more preferably at most 20 nm, most preferably at most 15 nm.

The dielectric layer based on an (oxi)nitride of Si, and/or an (oxi)nitride of Al, and/or alloys thereof, and/or an oxide of Al, Si, Ti, and/or Zr of a central anti-reflection layer may preferably have a thickness of at least 10 nm, more preferably at least 30 nm, even more preferably at least 40 nm, most preferably at least 50 nm; but preferably at most 80 nm, more preferably at most 70 nm, even more preferably at most 60 nm, most preferably at most 55 nm.

The dielectric top layer based on an oxide of Zn of a central anti-reflection layer may preferably have a thickness of at least 2 nm, more preferably at least 7 nm, even more preferably at least 12 nm, most preferably at least 15 nm; but preferably at most 25 nm, more preferably at most 20 nm, even more preferably at most 18 nm, most preferably at most 17 nm.

The upper anti-reflection layer may comprise at least a combination of one or more of the following layers:
at least one barrier layer based on an oxide of NiCr;
at least one barrier layer based on an oxide of Zn, an oxide of Ti and/or Ti;
a dielectric layer based on an (oxi)nitride of Si, and/or an (oxi)nitride of Al, and/or alloys thereof, and/or an oxide of Al, Si, Ti, and/or Zr; and
a dielectric layer based on a metal oxide, such as an oxide of Zn and Sn and/or an oxide of Sn.

In some preferred embodiments the upper anti-reflection layer comprises at least, in sequence from the silver-based functional layer that is located furthest from the glass substrate,
at least one barrier layer based on an oxide of Zn, an oxide of Ti and/or Ti;
at least one dielectric layer based on an (oxi)nitride of Si, and/or an (oxi)nitride of Al, and/or alloys thereof, and/or an oxide of Al, Si, Ti, and/or Zr; and
a dielectric layer based on a metal oxide, such as an oxide of Zn and Sn and/or an oxide of Sn.

An absorbing layer based on tungsten nitride may be located in said upper anti-reflection layer according to the preceding paragraph, for example it may be located between the at least one barrier layer based on an oxide of Zn, an oxide of Ti and/or Ti and the dielectric layer based on an (oxi)nitride of Si, and/or an (oxi)nitride of Al, and/or alloys thereof, and/or an oxide of Al, Si, Ti, and/or Zr. Preferably said absorbing layer is located between and in direct contact with the uppermost barrier layer based on an oxide of Zn, an oxide of Ti and/or Ti and the dielectric layer based on an (oxi)nitride of Si, and/or an (oxi)nitride of Al, and/or alloys thereof, and/or an oxide of Al, Si, Ti, and/or Zr.

In some other preferred embodiments the upper anti-reflection layer comprises at least, in sequence from the silver-based functional layer that is located furthest from the glass substrate,
at least one barrier layer based on an oxide of NiCr;
optionally, at least one barrier layer based on an oxide of Zn, an oxide of Ti and/or Ti;
a dielectric layer based on an (oxi)nitride of Si, and/or an (oxi)nitride of Al, and/or alloys thereof, and/or an oxide of Al, Si, Ti, and/or Zr, and
a dielectric layer based on a metal oxide, such as an oxide of Zn and Sn and/or an oxide of Sn.

An absorbing layer based on tungsten nitride may be located in said upper anti-reflection layer according to the preceding paragraph, for example, it may be located between the at least one barrier layer based on an oxide of NiCr and the dielectric layer based on an (oxi)nitride of Si, and/or an (oxi)nitride of Al, and/or alloys thereof, and/or an oxide of Al, Si, Ti, and/or Zr. In such cases, preferably the optional at least one barrier layer based on an oxide of Zn, an oxide of Ti and/or Ti is not present. Preferably said absorbing layer is located between and in direct contact with the uppermost barrier layer based on an oxide of NiCr and the dielectric layer based on an (oxi)nitride of Si, and/or an (oxi)nitride of Al, and/or alloys thereof, and/or an oxide of Al, Si, Ti, and/or Zr. It has been established that surprisingly a barrier layer based on an oxide of Zn, an oxide of Ti and/or Ti is not necessary when an absorbing layer is present. When a barrier layer based on an oxide of Zn, an oxide of Ti and/or Ti and an absorbing layer based on tungsten nitride are both present in said upper anti-reflection layer according to the preceding paragraph, preferably the absorbing layer is located between and in direct contact with the uppermost barrier layer based on an oxide of Zn, an oxide of Ti and/or Ti and the dielectric layer based on an (oxi)nitride of Si, and/or an (oxi)nitride of Al, and/or alloys thereof, and/or an oxide of Al, Si, Ti, and/or Zr.

A barrier layer based on an oxide of NiCr of the upper anti-reflection layer may preferably have a thickness of at least 0.3 nm, more preferably at least 0.4 nm, even more preferably at least 0.5 nm, most preferably at least 0.6 nm; but preferably at most 10 nm, more preferably at most 5 nm, even more preferably at most 2 nm, most preferably at most 1 nm. These preferred thicknesses enable further ease of deposition and improvement in optical characteristics such as haze whilst retaining mechanical durability.

A barrier layer based on an oxide of Zn and/or an oxide of Ti of the upper anti-reflection layer may preferably have a thickness of at least 1 nm, more preferably at least 2 nm, even more preferably at least 3 nm, most preferably at least 4 nm; but preferably at most 10 nm, more preferably at most 7 nm, even more preferably at most 6 nm, most preferably at most 5 nm. These preferred thicknesses enable further ease of deposition and improvement in optical characteristics such as haze whilst retaining mechanical durability.

The dielectric layer based on an (oxi)nitride of Si, and/or an (oxi)nitride of Al, and/or alloys thereof, and/or an oxide of Al, Si, Ti, and/or Zr of the upper anti-reflection layer may preferably have a thickness of at least 2 nm, more preferably at least 5 nm, even more preferably at least 10 nm, most preferably at least 15 nm; but preferably at most 40 nm, more preferably at most 30 nm, even more preferably at most 25 nm, most preferably at most 20 nm. Such thicknesses provide further improvement in terms of mechanical robustness of the coated pane. Said dielectric layer based on an (oxi)nitride of Si, and/or an (oxi)nitride of Al, and/or alloys thereof, and/or an oxide of Al, Si, Ti, and/or Zr may preferably be in direct contact with the uppermost barrier layer of the upper anti-reflection layer when the upper anti-reflection does not comprise an absorbing layer based on tungsten nitride.

The dielectric layer based on an (oxi)nitride of Si, and/or an (oxi)nitride of Al, and/or alloys thereof, and/or an oxide of Al, Si, Ti, and/or Zr, which can in some cases make up a major part of the upper anti-reflection layer, provides stability (better protection during heat treatments) and diffusion barrier properties. Said layer is preferably deposited as an Al nitride and/or Si nitride layer by reactive sputtering of a Si, Al or mixed SiAl target, e.g. of a $Si_{90}Al_{10}$ target in a $N_2$ containing atmosphere. The composition of the dielectric layer based on an (oxi)nitride of Al and/or an (oxi)nitride of Si may be essentially stoichiometric $Si_{90}Al_{10}N_x$.

The dielectric layer based on a metal oxide, such as an oxide of Zn and Sn and/or an oxide of Sn of the upper anti-reflection layer may preferably have a thickness of at least 1 nm, more preferably at least 4 nm, even more preferably at least 6 nm, most preferably at least 8 nm; but preferably at most 20 nm, more preferably at most 15 nm, even more preferably at most 12 nm, most preferably at most 10 nm. Such thicknesses provide further improvement in terms of mechanical robustness of the coated pane. When said layer is an oxide of Zn and Sn it preferably comprises about 10-90 wt. % Zn and 90-10 wt. % Sn, more preferably about 40-60 wt. % Zn and about 40-60 wt. % Sn, preferably about 50 wt. % each of Zn and Sn, in wt. % of its total metal content. Said layer may be deposited by reactive sputtering of a mixed ZnSn target in the presence of $O_2$ and contributes to the anti-reflection properties of the upper anti-reflection layer.

The dielectric layer based on an (oxi)nitride of Si, and/or an (oxi)nitride of Al, and/or alloys thereof, and/or an oxide of Al, Si, Ti, and/or Zr of the upper anti-reflection layer may be in direct contact with the dielectric layer based on a metal oxide of the upper anti-reflection layer as defined herein without any intervening further dielectric layer.

Preferably the dielectric layer based on a metal oxide of the upper anti-reflection layer comprises a layer based on an oxide of Zn and Sn and/or an oxide of Sn.

The upper anti-reflection layer may have a total thickness of from 20 to 60 nm, preferably from 20 to 50 nm, more preferably from 20 to 40 nm, even more preferably from 25 to 35 nm.

A protective layer may be deposited as a top layer (outermost layer) of the upper anti-reflection layer for increased mechanical and/or chemical robustness, e.g. scratch resistance. Said protective layer may comprise a layer based on an oxide of Al, Si, Ti, and/or Zr.

To reduce the light transmittance increase during a heat treatment all individual layers of the upper, central and lower anti-reflection layers apart from the barrier layers are preferably deposited with an essentially stoichiometric composition.

To further optimize the optical properties of the coated pane the upper and/or lower anti-reflection layers may comprise further partial layers consisting of suitable materials generally known for dielectric layers of low-e and/or solar control coatings, in particular chosen from one or more of the oxides of Ce, Hf, Ta, Al or combinations thereof. When adding such further partial layers it should however be verified that the heat treatability aimed at herein is not impaired thereby.

It will be appreciated that any further partial layer may contain additives that modify its properties and/or facilitate its manufacture, e.g. doping agents or reaction products of reactive sputtering gases. In the case of oxide based layers nitrogen may be added to the sputtering atmosphere leading to the formation of oxinitrides rather than oxides, in the case of nitride based layers oxygen may be added to the sputtering atmosphere, also leading to the formation of oxinitrides rather than nitrides.

Care must be taken by performing a proper material, structure and thickness selection when adding any such further partial layer to the basic layer sequence of the inventive pane that the properties primarily aimed at, e.g. a high thermal stability, are not significantly impaired thereby.

The invention is not limited to a specific production process for the coating. However, it is particularly preferred if at least one of the layers and most preferably all layers are applied by magnetron cathode sputtering, either in the DC mode, in the pulsed mode, in the medium frequency mode or in any other suitable mode, whereby metallic or semi-conducting targets are sputtered reactively or non-reactively in a suitable sputtering atmosphere. Depending on the materials to be sputtered planar or rotating tubular targets may be used.

The coating process is preferably carried out by setting up suitable coating conditions such that any oxygen (or nitrogen) deficit of any oxide (or nitride) layer of the anti-reflection layers of the coating is kept low to achieve a high stability of the light transmittance and colour of the coated glass panes during a heat treatment.

The thermal stability of coated glass panes according to the invention is reflected by the fact that the heat treated coated glass panes do not exhibit unacceptable levels of haze. Large increases in the haze value if detected during a heat treatment would indicate that the coating is beginning to be damaged.

According to another aspect of the present invention there is provided a multiple glazing incorporating a coated glass pane in accordance with the present invention. For example the multiple glazing may be laminated glass or insulating glass.

The invention will now be further described by way of the following specific embodiments, which are given by way of illustration and not of limitation:

For all Examples the coatings were deposited on 6 mm thick standard float glass panes (10 cm×10 cm) with a light transmittance of about 89% using AC and/or DC magnetron sputtering devices, medium-frequency sputtering being applied where appropriate. Prior to coating, the glass was washed twice on a Benteler® washing machine.

All dielectric layers of an oxide of Zn and Sn ($ZnSnO_x$, weight ratio Zn:Sn≈50:50) were reactively sputtered from zinc-tin targets in an $Ar/O_2$ sputter atmosphere.

The ZnO:Al growth promoting dielectric top layers of the lower, central and upper anti-reflection layers were sputtered from Al-doped Zn targets (Al content about 2 wt. %) in an $Ar/O_2$ sputter atmosphere.

The functional layers that in all Examples consisted of essentially pure silver (Ag) were sputtered from silver targets in an Ar sputter atmosphere without any added oxygen and at a partial pressure of residual oxygen below $10^{-5}$ mbar.

The barrier layers of substoichiometric $NiCrO_x$ were reactively sputtered from nickel-chromium targets in an $Ar/O_2$ sputter atmosphere.

The absorbing barrier layers of NiCr were sputtered from nickel-chromium targets in an Ar sputter atmosphere containing only residual oxygen.

The barrier layers of Al-doped zinc oxide (ZnO:Al, "ZAO") were sputtered from conductive ceramic $ZnO_x$:Al targets in an $Ar/O_2$ sputter atmosphere with low oxygen content.

The dielectric layers of mixed silicon aluminium nitride ($Si_{90}Al_{10}N_x$) were reactively sputtered from mixed $Si_{90}Al_{10}$ targets in an $Ar/N_2$ sputter atmosphere containing only residual oxygen. The layers of Al nitride were reactively sputtered from Al targets in an $Ar/N_2$ sputter atmosphere containing only residual oxygen.

The absorbing layers of tungsten nitride were reactively sputtered from W targets in an $Ar/N_2$ sputter atmosphere containing only residual oxygen.

TABLE 1

Haze score, light transmittance and reflection properties for a comparative coated glass pane and a coated glass pane according to the present invention. Where: AD = as deposited, HT = after heat treatment, Colour Rf = colour in reflection when viewed from the coated side of the pane, Colour Rg = colour in reflection when viewed from the non-coated (glass) side of the pane, ΔE = change in reflection colour upon heat treatment, and % $T_L$ = percentage light transmittance. The methodology used to collect the data in Table 1 is set out below. In Table 1, for each example the layers were deposited onto a glass pane in sequence starting with the first layer shown.

| Stack (First Layer Deposited On Glass) | Colour Rf (AD) | | | Colour Rf (HT) | | | | Colour Rg (AD) | | | Colour Rg (HT) | | | | % $T_L$ | | |
|---|---|---|---|---|---|---|---|---|---|---|---|---|---|---|---|---|---|
| | Y | a* | b* | Y | a* | b* | ΔE | Y | a* | b* | Y | a* | b* | ΔE | AD | HT | Haze |
| Example 1 (Comparative) $Si_3N_4$ (12 nm)/ $ZnSnO_x$ (5 nm)/ZAO (8 nm)/Ag (7.4 nm)/ $NiCrO_x$ (0.8 nm)/ZAO (6 nm)/$AlN_x$ (51 nm)/ $ZnSnO_x$ (17.5 nm)/ ZAO (8 nm)/Ag (15.3 nm)/NiCr (6.4 nm)/ZAO (6 nm)/ $AlN_x$ (19 nm)/$ZnSnO_x$ (6.7 nm) | 12.5 | 3.4 | 20.6 | 17.6 | 2.3 | 14 | 8.4 | 14.5 | −5.3 | −18.7 | 15.1 | −3.9 | −11.2 | 7.7 | 43.7 | 53.9 | 0 |
| Example 2 $Si_3N_4$ (26 nm)/ $ZnSnO_x$ (3 nm)/ZAO (10 nm)/Ag (8 nm)/ $NiCrO_x$ (1 nm)/ZAO (5 nm)/$AlN_x$ (54 nm)/ $ZnSnO_x$ (11 nm)/ZAO (16 nm)/Ag (17 nm)/ $NiCrO_x$ (1 nm)/ tungsten nitride (3 nm)/ $AlN_x$ (16 nm)/ $ZnSnO_x$ (9 nm) | 17.2 | −0.8 | 17.2 | 17.8 | −2.2 | 16.4 | 1.8 | 15.4 | −3.3 | −9.0 | 15.8 | −3.0 | −8.8 | 0.7 | 48.6 | 55.3 | 0 |

Heat Treatability Tests

After the deposition of the coatings of the Examples, $T_L$ and colour values were measured and the samples were heat treated at about 610° C. for about 5 minutes. Thereafter haze, $T_L$, and colour values were measured. The results are listed in Table 1 above.

The values stated for the % light transmittance % $T_L$ of the coated glass panes in the Examples were derived from measurements according to EN 140.

The colour characteristics were measured and reported using the well established CIE LAB a*, b* coordinates (see e.g. [0030] and [0031] in WO 2004-063111 A1). Preferably coated panes exhibit reflection colour modifications caused by a heat treatment that are so small that heat treated and non-heat treated coated glass panes may be glazed adjacent to each other without a reflection colour difference that is significantly larger than unavoidable production tolerances for coated glass panes. To achieve this the coated panes should exhibit a $\Delta E^* \leq 3$, preferably $\Delta E^* \leq 2$ (where the change in reflection colour upon heat treatment, $\Delta E^* = SQR[(L^*_1 - L^*_2)^2 + (a^*_1 - a^*_2)^2 + (b^*_1 - b^*_2)^2]$, $L^*_i$, $a^*_i$ and $b^*_i$ being the reflection colour values before and after heat treatment). The colour change, $\Delta E^*$, is defined by 1976 CIE ($L^*a^*b^*$) with illuminant D65 and 10° observer.

A subjective visible haze scoring system was applied to the Example. The quality assessment system described hereinafter was found to be needed to distinguish better the visual quality of coatings under bright light conditions, properties that are not fully reflected by standard haze values measured in accordance with ASTM D 1003-61.

The evaluation system considers the more macroscopic effect of visible faults in the coating which cause local colour variations where the coating is damaged or imperfect (haze score in Table 1). Macroscopic effects of visible faults in the coating after a heat treatment (all examples exhibit no haze before a heat treatment) were assessed subjectively by viewing samples under bright light. The evaluation is based upon a perfectness scoring (rating) system using scores between 0 (perfect, no faults) through to 3 (high number of clearly visible faults and/or spots) up to 5 (dense haze, often already visible to the naked eye), rating the visual appearance of the coated glass samples after a heat treatment.

The visual evaluation was carried out by using a 2.5 million candela power beam (torch) that is directed at incidence angles between about −90° to about +90° (relative to normal incidence) in two orthogonal planes (i.e. turning the torch first in a horizontal plane and then in a vertical plane) onto a coated glass pane that is arranged in front of a black box. The black box has a sufficiently large size such that several coated glass samples can be evaluated at the same time. The coated glass panes are observed and their visual quality was assessed by varying the angle of incidence as described above, by directing the light beam from the observer through the coated glass panes. The coated glass panes were arranged in front of the black box such that their coating faced the observer. Heat treated coated glass panes with any score ≥3 are considered as having failed the test.

Summary of Results

The coated pane of Comparative Example 1 utilises a NiCr absorbing barrier layer in the upper anti-reflection layer to provide both absorbing and barrier properties. The coated pane shows no detectable haze upon heat treatment. However, the pane shows large changes in reflection colour properties upon heat treatment, such that the $\Delta E$ values with regard to observation from both the coated side and the glass side are both high.

In contrast, the coated pane of Example 2, which uses a tungsten nitride absorbing layer above a $NiCrO_x$ barrier layer in the upper anti-reflection layer, exhibits very small changes in reflection colour properties upon heat treatment, such that the $\Delta E$ values with regard to observation from both the coated side and the glass side are very low. The low light transmittance values show the effect of the tungsten nitride absorbing layer and there is also minimal change in light transmittance upon heat treatment. This minimal change in light transmittance is mainly due to the two $NiCrO_x$ layers, which are further oxidised during heat treatment. Furthermore, the coated pane shows no detectable haze upon heat treatment.

In the discussion of the invention above, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

In the context of the present invention, where a layer is said to be "based on" a particular material or materials, this means that the layer predominantly consists of the corresponding said material or materials, which means typically that it comprises at least about 50 at. % of said material or materials.

In the context of the present invention, an "essentially stoichiometric oxide" means an oxide that is at least 95% but at most 105% stoichiometric, whilst a "slightly substoichiometric oxide" means an oxide that is at least 95% but less than 100% stoichiometric.

If nothing else is specified light transmittance values referred to in the specification are generally specified with reference to a coated glass pane comprising a 4 mm thick standard float glass pane having a light transmittance $T_L$ of 89% without a coating.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A coated glass pane comprising at least the following layers in sequence:
   a glass substrate;
   a lower anti-reflection layer;

wherein the lower anti-reflection layer comprises one or more of the following layers:
a dielectric base layer based on an (oxi)nitride of Si and/or an (oxi)nitride of Al and/or alloys thereof, and/or an oxide of and/or an oxide of Ti, and/or an oxide of Zr;
a dielectric layer based on a metal oxide; and
a dielectric top layer based on an oxide of Zn; and
a silver-based functional layer; and
at least one further anti-reflection layer; wherein the further anti-reflection layer comprises at least the following layers in sequence:
at least one underlying barrier layer based on NiCr, Nb, Ti, Zr, Zn, Sn, In, and/or Cr and/or their oxides and/or nitrides;
at least one absorbing layer based on tungsten nitride located in direct contact with the underlying barrier layer; and
at least one overlying dielectric layer located in direct contact with the absorbing layer, said overlying dielectric layer comprising a dielectric layer based on an (oxi)nitride of Si and/or an (oxi)nitride of Al and/or alloys thereof; and/or a dielectric layer based on a metal oxide;
wherein when the overlying dielectric layer is based on an (oxi)nitride of Si and/or an (oxi)nitride of Al and/or alloys thereof, the underlying barrier layer that is in direct contact with the at least one absorbing layer, is not based on an (oxi)nitride of Si and/or an (oxi)nitride of Al and/or alloys thereof and wherein the change in reflection color of the coated glass pane after a heat treatment is less than or equal to 3.

2. The coated glass pane according to claim 1, wherein the at least one underlying barrier layer located in a given anti-reflection layer has a total thickness of at least 0.5 nm, but at most 8 nm.

3. The coated glass pane according to claim 1, wherein the at least one overlying dielectric layer comprises a dielectric layer based on an (oxi)nitride of Si and/or an (oxi)nitride of Al and/or alloys thereof; and/or a dielectric layer based on an oxide of one or more of Ti, Zr, Zn, Sn, In, and/or Nb.

4. The coated glass pane according to claim 1, wherein the at least one overlying dielectric layer comprises a dielectric layer based on an (oxi)nitride of Si and/or an (oxi)nitride of Al and/or alloys thereof; and/or a dielectric layer based on an oxide of Zn and Sn.

5. The coated glass pane according to claim 1, wherein each absorbing layer has a thickness of at least 2 nm but at most 25 nm.

6. The coated glass pane according to claim 1, wherein the lower anti-reflection layer comprises one or more of the following layers:
a dielectric base layer based on an (oxi)nitride of Si and/or an (oxi)nitride of Al and/or alloys thereof; and/or an oxide of Ti; and/or an oxide of Zr;
a dielectric layer based on an oxide of Zn and Sn, an oxide of Sn, and/or an oxide of Nb; and
a dielectric top layer based on an oxide of Zn.

7. The coated glass pane according to claim 1, wherein the pane comprises more than one silver-based functional layer,
wherein each silver-based functional layer is spaced apart from an adjacent silver-based functional layer by a central anti-reflection layer,
wherein an anti-reflection layer that is located furthest from the glass substrate is called the upper anti-reflection layer, and
wherein at least one absorbing layer based on tungsten nitride is located in the upper anti-reflection layer and/or in a central anti-reflection layer.

8. The coated glass pane according to claim 7, wherein the central anti-reflection layer(s) comprises at least one or more of the following layers:
at least one barrier layer based on an oxide of NiCr;
at least one barrier layer based on an oxide of Zn, an oxide of Ti, and/or Ti;
a dielectric layer based on a metal oxide; and
a dielectric layer based on an (oxi)nitride of Si, and/or an (oxi)nitride of Al, and/or alloys thereof, and/or an oxide of Al, Si, Ti, and/or Zr.

9. The coated glass pane according to claim 7, wherein the central anti-reflection layer(s) comprises at least one or more of the following layers:
at least one barrier layer based on an oxide of NiCr;
at least one barrier layer based on an oxide of Zn, an oxide of Ti, and/or Ti;
a dielectric layer based on an oxide of Zn and Sn, an oxide of Sn, and/or an oxide of Nb; and
a dielectric layer based on an (oxi)nitride of Si, and/or an (oxi)nitride of Al, and/or alloys thereof, and/or an oxide of Al, Si, Ti, and/or Zr.

10. The coated glass pane according to claim 7, wherein each central anti-reflection layer comprises at least, in sequence from the silver-based functional layer that is located nearest to the glass substrate out of the silver-based functional layers that the central anti-reflection layer is located between,
at least one barrier layer based on an oxide of NiCr;
optionally, at least one barrier layer based on an oxide of Zn, an oxide of Ti, and/or Ti;
a dielectric layer based on an (oxi)nitride of Si, and/or an (oxi)nitride of Al, and/or alloys thereof, and/or an oxide of Al, Si, Ti, and/or Zr;
a dielectric layer based on an oxide of Zn and Sn and/or an oxide of Sn; and
a dielectric top layer based on an oxide of Zn;
wherein when at least one absorbing layer based on tungsten nitride is located in said central anti-reflection layer, said optional at least one barrier layer based on an oxide of Zn, an oxide of Ti, and/or Ti is not present and said absorbing layer is located between the at least one barrier layer based on an oxide of NiCr and the dielectric layer based on an (oxi)nitride of Si, and/or an (oxi)nitride of Al, and/or alloys thereof, and/or an oxide of Al, Si, Ti, and/or Zr.

11. The coated glass pane according to claim 7, wherein each central anti-reflection layer comprises at least, in sequence from the silver-based functional layer that is located nearest to the glass substrate out of the silver-based functional layers that the central anti-reflection layer is located between,
at least one barrier layer based on an oxide of NiCr;
optionally, at least one barrier layer based on an oxide of Zn, an oxide of Ti, and/or Ti;
a dielectric layer based on an (oxi)nitride of Si, and/or an (oxi)nitride of Al, and/or alloys thereof, and/or an oxide of Al, Si, Ti, and/or Zr;
a dielectric layer based on a metal oxide; and
a dielectric top layer based on an oxide of Zn;
wherein when at least one absorbing layer based on tungsten nitride is located in said central anti-reflection layer, said optional at least one barrier layer based on an oxide of Zn, an oxide of Ti, and/or Ti is not present and said absorbing layer is located between the at least one barrier layer based on an oxide of NiCr and the dielectric layer based on an (oxi)nitride of Si, and/or an (oxi)nitride of Al, and/or alloys thereof, and/or an oxide of Al, Si, Ti, and/or Zr.

12. The coated glass pane according to claim 11, wherein at least one absorbing layer based on tungsten nitride is located in said central anti-reflection layer between and in direct contact with the uppermost barrier layer based on an oxide of NiCr and the dielectric layer based on an (oxi)nitride of Si, and/or an (oxi)nitride of Al, and/or alloys thereof, and/or an oxide of Al, Si, Ti, and/or Zr.

13. The coated glass pane according to claim 1, wherein the anti-reflection layer that is located furthest from the glass substrate is called the upper anti-reflection layer, and wherein the upper anti-reflection layer comprises at least one or more of the following layers:
    at least one barrier layer based on an oxide of NiCr;
    at least one barrier layer based on an oxide of Zn, an oxide of Ti, and/or Ti;
    a dielectric layer based on an (oxi)nitride of Si, and/or an (oxi)nitride of Al, and/or alloys thereof, and/or an oxide of Al, Si, Ti, and/or Zr; and
    a dielectric layer based on an oxide of Zn and Sn and/or an oxide of Sn.

14. The coated glass pane according to claim 1, wherein the anti-reflection layer that is located furthest from the glass substrate is called the upper anti-reflection layer, and wherein the upper anti-reflection layer comprises at least one or more of the following layers:
    at least one barrier layer based on an oxide of NiCr;
    at least one barrier layer based on an oxide of Zn, an oxide of Ti, and/or Ti;
    a dielectric layer based on an (oxi)nitride of Si, and/or an (oxi)nitride of Al, and/or alloys thereof, and/or an oxide of Al, Si, Ti, and/or Zr; and
    a dielectric layer based on a metal oxide.

15. The coated glass pane according to claim 14, wherein the upper anti-reflection layer comprises at least, in sequence from the silver-based functional layer that is located furthest from the glass substrate,
    at least one barrier layer based on an oxide of NiCr;
    optionally, at least one barrier layer based on an oxide of Zn, an oxide of Ti, and/or Ti;
    a dielectric layer based on an (oxi)nitride of Si, and/or an (oxi)nitride of Al, and/or alloys thereof, and/or an oxide of Al, Si, Ti, and/or Zr; and
    a dielectric layer based an oxide of Zn and Sn and/or an oxide of Sn;
    wherein when at least one absorbing layer based on tungsten nitride is located in said upper anti-reflection layer, said optional at least one barrier layer based on an oxide of Zn is not present and said absorbing layer is located between the at least one barrier layer based on an oxide of NiCr and the dielectric layer based on an (oxi)nitride of Si, and/or an (oxi)nitride of Al, and/or alloys thereof, and/or an oxide of Al, Si, Ti, and/or Zr.

16. The coated glass pane according to claim 14, wherein the upper anti-reflection layer comprises at least, in sequence from the silver-based functional layer that is located furthest from the glass substrate,
    at least one barrier layer based on an oxide of NiCr;
    optionally, at least one barrier layer based on an oxide of Zn, an oxide of Ti, and/or Ti;
    a dielectric layer based on an (oxi)nitride of Si, and/or an (oxi)nitride of Al, and/or alloys thereof, and/or an oxide of Al, Si, Ti, and/or Zr; and
    a dielectric layer based on a metal oxide;
    wherein when at least one absorbing layer based on tungsten nitride is located in said upper anti-reflection layer, said optional at least one barrier layer based on an oxide of Zn is not present and said absorbing layer is located between the at least one barrier layer based on an oxide of NiCr and the dielectric layer based on an (oxi)nitride of Si, and/or an (oxi)nitride of Al, and/or alloys thereof, and/or an oxide of Al, Si, Ti, and/or Zr.

17. The coated glass pane according to claim 16, wherein at least one absorbing layer based on tungsten nitride is located in said upper anti-reflection layer between and in direct contact with the uppermost barrier layer based on an oxide of NiCr and the dielectric layer based on an (oxi)nitride of Si, and/or an (oxi)nitride of Al, and/or alloys thereof, and/or an oxide of Al, Si, Ti, and/or Zr.

18. A multiple glazing incorporating a coated glass pane in accordance with claim 1.

* * * * *